United States Patent [19]

Scarazzo et al.

[11] Patent Number: 5,736,091
[45] Date of Patent: Apr. 7, 1998

[54] METHOD OF MANUFACTURING COMPOSITE TUBING

[75] Inventors: Christopher Scarazzo, Twinsburg; Lawrence N. Mears, Solon, both of Ohio

[73] Assignee: OEM/Miller Corporation, Aurora, Ohio

[21] Appl. No.: 613,066

[22] Filed: Mar. 8, 1996

Related U.S. Application Data

[62] Division of Ser. No. 394,393, Feb. 24, 1995.

[51] Int. Cl.⁶ .................................................. B29C 45/14
[52] U.S. Cl. ...................... 264/263; 264/267; 264/275; 264/279; 425/112; 425/116; 425/129.1; 425/468; 425/577; 425/DIG. 218
[58] Field of Search ............... 425/112, 129.1, 425/577, 468, DIG. 218, 116; 264/259, 263, 266, 267, 275, 279

[56] References Cited

U.S. PATENT DOCUMENTS

| | | | |
|---|---|---|---|
| 2,561,351 | 7/1951 | Fentress | 425/129.1 |
| 2,956,305 | 10/1960 | Raydt et al. | |
| 3,090,996 | 5/1963 | Reichenback et al. | |
| 3,297,055 | 1/1967 | Beck . | |
| 3,599,677 | 8/1971 | O'Brien . | |
| 3,715,454 | 2/1973 | Kleykamp . | |
| 4,106,967 | 8/1978 | Logan et al. | |
| 4,122,870 | 10/1978 | Hines | 138/109 |
| 4,205,034 | 5/1980 | Newberry . | |
| 4,344,907 | 8/1982 | Herrington . | |
| 4,410,479 | 10/1983 | Cyrlax . | |
| 4,415,389 | 11/1983 | Medford et al. | |
| 4,439,130 | 3/1984 | Dickhut et al. | |
| 4,465,449 | 8/1984 | Hornbeck . | |
| 4,724,111 | 2/1988 | Iwata et al. | |
| 4,752,208 | 6/1988 | Iwata et al. | |
| 5,037,143 | 8/1991 | Sanders et al. | |
| 5,089,074 | 2/1992 | Winter et al. | |
| 5,129,428 | 7/1992 | Winter et al. | |
| 5,129,429 | 7/1992 | Winter et al. | |
| 5,129,686 | 7/1992 | Sanders et al. | |
| 5,145,545 | 9/1992 | Winter et al. | |
| 5,148,836 | 9/1992 | Lawrence . | |
| 5,160,688 | 11/1992 | Hockett | 264/275 |
| 5,209,267 | 5/1993 | Morin | 138/109 |
| 5,297,586 | 3/1994 | McIntosh | 138/109 |
| 5,305,799 | 4/1994 | Dal Palu . | |
| 5,348,051 | 9/1994 | Kallenbach . | |
| 5,380,050 | 1/1995 | Sanders et al. | 138/121 X |
| 5,413,147 | 5/1995 | Moreiras et al. | 138/109 |
| 5,505,898 | 4/1996 | Goto et al. | 264/279 |
| 5,529,743 | 6/1996 | Powell | 264/279 |

Primary Examiner—Jay H. Woo
Assistant Examiner—Joseph Leyson
Attorney, Agent, or Firm—Watts, Hoffmann, Fisher & Heinke Co., L.P.A.

[57] ABSTRACT

A method of making a composite tube utilizing known equipment and process to form spaced end sections and a central section having an inner corrugated portion and surrounding portion bonded to at least certain crests of the corrugations. A spaced pair of generally cylindrical end couplings are formed by sequentially telescoping the end sections over an internal cylindrically contoured die part and continuing the telescoping until an inner surface of the telescoped end section engages at least three circumferentially spaced fingers to locate the telescoped end section in concentric relationship with the core part. Positioning an external die part in spaced concentric relationship around the telescoped end section, the external die part having an inner surface contoured to the desired external configuration of a coupling being formed. Injecting a heat softened thermoplastic material into the space between the die inner surface and the core to form a coupling. As the thermoplastic material is injected it is maintained at a sufficiently elevated temperature to effect a bonding between the coupling and the telescoped end section.

5 Claims, 3 Drawing Sheets

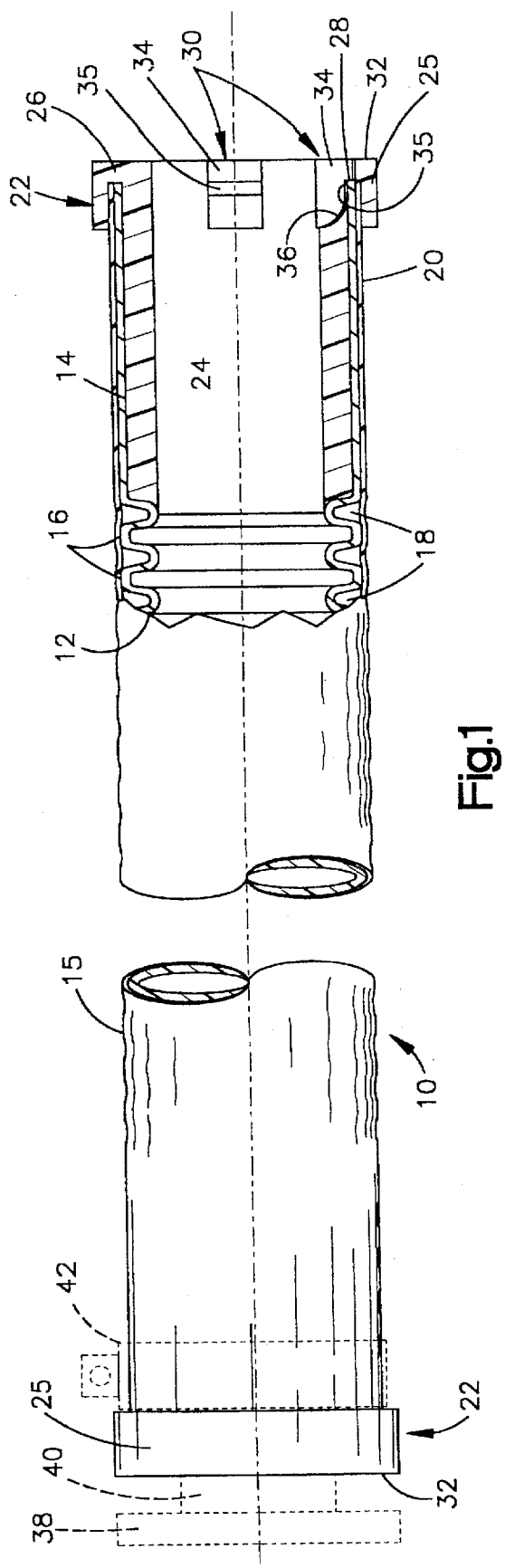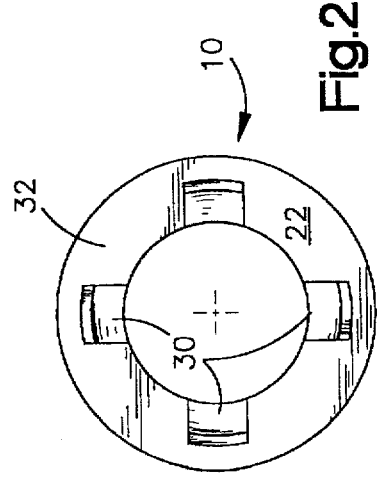

METHOD OF MANUFACTURING COMPOSITE TUBING

This is a division of U.S. patent application Ser. No. 08/394,393 filed Feb. 24, 1995.

FIELD OF THE INVENTION

This invention relates to plastic tubing and a method of its manufacture and more particularly to a composite tube including an inner corrugated tube, a crosshead extruded reinforcing tube and end couplings for connection of the composite tube to a fluid conduit.

BACKGROUND OF THE INVENTION

The continuous formation of corrugated tubing is now well known. Machines suitable for this purpose are manufactured and sold by, among others, Cullom Machine Tool & Die, Inc. of Cullom, Ill. One such machine is represented by U.S. Pat. No. 4,439,130 issued Mar. 27, 1984 to Cullom Machine under the title Plastic Tile Corrugator.

With such a machine an essentially endless tube is formed which may be a series of relatively short corrugated tube sections each with cylindrical end coupling sections at either end. The relatively short sections are formed end to end and the continuous tube is subsequently cut to provide individual corrugated tubes with cylindrical ends for such uses as washing machine drain hose.

It is also known to crosshead extrude a reinforcing sleeve around a continuous tube after the corrugations and end sections have been formed, but prior to severance of the essentially endless tube into a series of individual tubes and to thus produce composite tubes.

While such reinforced or composite tubes have been produced, they have been characterized by relatively low hoop strength or burst resistance. Typically, such composite tubes have been used in relatively placid environments such as for vacuum cleaner hose where the temperatures are ambient room temperatures and the pressures are some fraction of ambient atmospheric pressure.

Where the inner tube of such a composite tube has been corrugated, a crosshead extruded outer tube has either been formed in intimate engagement with the inner tube corrugations, the corrugations' valleys have been filled or alternately the outer tube has been a tubular jacket secured only to the end sections of the inner tube.

Further, such prior composite tubes have lacked reinforcing coupling portions to adapt the composite tube for use in harsh environments where elevated temperatures and pressure may be experienced.

SUMMARY OF THE INVENTION

A composite tube made in accordance with the present invention includes a corrugated inner tube vacuum formed from a thermoplastic polymer. Cylindrical end portions of substantially the same wall thickness as the corrugated central portion are integrally formed. A thermoplastic reinforcing tube is crosshead extruded around the inner tube stretching from crest to crest of the corrugations and bonded to each of the corrugations. In addition the reinforcing tube has cylindrical end portions that are in tight, intimate, bonded relationship with the end portions of the inner tube.

The composite tube of the present invention includes end couplings which are molded within and around and bonded to the cylindrical end portions of both the inner and reinforcing tubes. The resultant composite tube is capable of withstanding temperatures and pressures far in excess of prior proposed composite tubes of the same general type. As such the composite tubes are ideally suited for such applications as automobile heater hoses where coolant temperatures of up to the order 230° F. and pressures of the order of 300 psi can be experienced.

One of the outstanding features of the invention is the provision of a plurality of circumferentially spaced expansion reliefs or recesses formed within the coupling at its ends. These recesses facilitate expansion of a small end part of the composite tube for telescoping the tube over, for example, an inlet tube to an automotive radiator, when the hose is used as a heater hose return line.

The coupling includes an external flange part for juxtaposed relationship with a clamp surrounding and compressing the cylindrical end sections of both the inner and the reinforcing tubes and an inner portion of the coupling itself which projects into the cylindrical end portion of the inner tube in tubular, intimate, bonded relationship.

The invention also includes a novel process of producing the composite tube of this invention and in particular of forming the end couplings including their recesses.

A novel and improved coupling mold is provided. The mold includes a base die half with an inner surface delineating the perimeter of half a coupling cavity. An inner or core pin die section is pivotally mounted on the base die half. The core pin is pivotal between a tube insert and removal position and a coupling formation position. When in the coupling performing position a second mating die half is mated with the base die half. The mating die half includes an inner coupling defining surface which coacts with the base die half surface to delineate the perimetral configuration of an end coupling to be formed.

When a coupling is to be formed the core pin is pivoted to its tube insert position. An end portion of a composite tube is then telescoped over the core pin until the end portion is in tight surface engagement with at least three and preferably four locating fingers near the base end of the core pin. The core pin, and with it the attached composite tube are then positioned in the coupling formation position and the mating die half is positioned on the base half. The tube is then clamped to provide resistance to axial forces which may occur as the coupling is being formed, which forces tend to urge the composite tube out of the die. Thus, the tube is clamped to assure that it will remain in the die as the die cavity is filled with a suitable hot, thermoplastic polymer.

As the hot thermoplastic polymer, preferably so called thermoplastic elastomer, is injected into the mold the defined die cavity is filled to form a coupling having a tubular inner portion that is concentric with, in intimate contact with and bonded to the interior of the inner tube end portion. A perimetral coupling flange portion is formed around, in intimate contact with, and bonded to an end part of the reinforcing tube end portion. Further, coupling material forms an end part bonding the perimetral flange and the internal tubular portion together into an integrally molded end coupling. The end part of the coupling is in intimate contact with and bonded to ends of the inner and reinforcing tube end portions.

To achieve the bonding of the coupling to the inner and reinforcing tubes, the coupling material is maintained at a temperature of the order of 400° F. as it is injected into the mold, so that the temperature of the injected material is sufficient to cause surface softening of the tube end portions and effect a fusing or bonding of the coupling to them.

The upper die section is then removed, the core pin is pivoted to its tube insert and removal position and the finished tube and coupling are removed from the core pin. The previously described circumferential reliefs or recesses are present in that they have been delineated by the die locating fingers. Thus, the die locating fingers serve the unique dual function of assuring concentric positioning of a tube on which a coupling is to be formed relative to the core pin and delineation of the expansion reliefs which facilitate use of the finished tube composite tube including the couplings.

Accordingly, the objects of this invention are to provide a novel and improved composite tube and a method of making such tube including its novel coupling.

DRAWING DESCRIPTION

FIG. 1 is foreshortened elevational view of the composite tube of this invention showing one end portion in cross section;

FIG. 2 is an end elevational view of the tube of FIG. 1;

Figure 3:
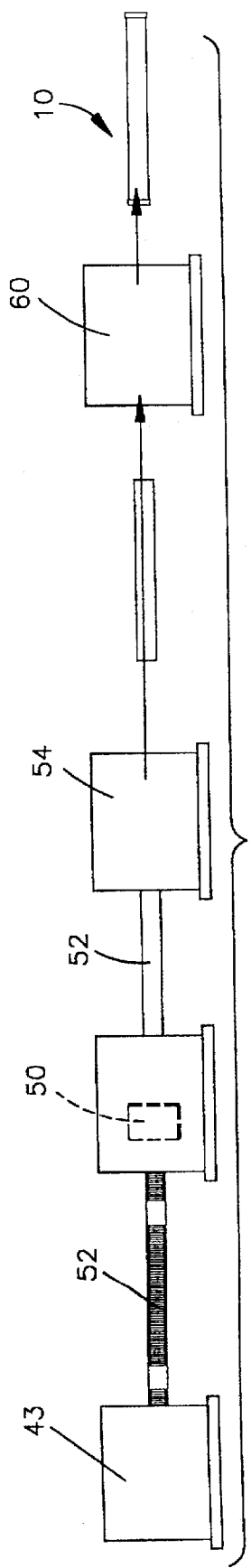
FIG. 3 is a schematic view of the continuous formation of composite tube sections and severance of the continued tube into individual sections.

DESCRIPTION OF PREFERRED EMBODIMENT
The Composite Tube

Referring now to the drawings and to FIG. 1 in particular, a composite tube is shown generally at 10. The composite tube includes an inner tube 11 having a central corrugated portion 12 and cylindrically contoured end portions 14. A reinforcing tube 15 surrounds the inner tube 11. The reinforcing tube 15 is generally cylindrical in configuration engaging crests 16 of the corrugations and spanning valleys 18 between the corrugations. Thus, there are annular spaces in the valleys 18 within the reinforcing tube 15 and between successive crests 16.

The reinforcing tube 15 includes generally cylindrically contoured end portions 20. Each reinforcing end portion 20 surrounds and is in intimate, bonded engagement with a corresponding inner tube end portion 14. Similarly, the reinforcing tube is in intimate, bonded engagement with the crests 16.

End couplings 22 are formed at each end of the composite tube 10. Each coupling 22 includes a cylindrically contoured tubular inner section 24. The inner section 24 is disposed within and in circumferential intimate bonded engagement with its associated inner tube end portion 14.

Each coupling 22 includes an outer annular flange section 25. Each annular flange section 25 surrounds its associated reinforcing tube end portion 20 in intimate, bonded engagement. Each coupling has an end part 26 overlying and bonded to ends 28 of the tube end portions 14, 20. Each end part 26 is integrally formed and interconnects the internal and flange sections 24, 25.

The disclosed and preferred coupling has four circumferentially disposed reliefs 30 which extend axially inwardly from outer end 32 of the coupling 22. The reliefs 30 extend from the end 32 inwardly to a termination that is within the end portions 14, 20. Each relief 30 is of stepped configuration having an outer end part 34 having a diameter equal to the outside diameter of the inner tube end portion 14 and thus exposing a part of the end 28 of the inner tube portion. Each relief 30 extends inwardly of the inner tube portion 14 exposing a small part 35 of the inner surface of the end portion 14 and thus delineating the step configuration. Each relief 30 at its innermost end terminates in a radius 36.

The inner tube 11 is preferably formed of polypropylene and is of uniform thickness from end to end. Polyamides may also be suitable. The thickness of the inner tube is from 0.025 to 0.040 inch and preferably about 0.032 inch. The preferred polypropylene material for the inner tube is sold by Exxon Chemical Polymers Group under the trademark ESCORENE® and the designation PLTD996. This material is a high melt strength, very high impact copolymer. The typical properties of the material are as follows:

| Resin Properties | ASTM Method | US Units | SI Units |
|---|---|---|---|
| PHYSICAL | | | |
| Melt Flow Rate (230/2.16) | D 1238 | 0.8 g/10 min | |
| Density | D 792 | 0.89 g/cm$^3$ | |
| MECHANICAL | | | |
| Tensile Strength @ Yield (20 in/min) | D 638 | 2540 psi | 18 MPa |
| Elongation @ Yield (20 in/min) | D 638 | 30% | |
| Flexural Modulus 1% Secant (0.05 in/min) | D 790A | 70 kpsi | 480 MPa |
| Izod Impact Strength Notched, 23° C. | D 256 | >10 ft-lb in (No Break) | >540 J/m (No Break) |
| Gardner Impact Strength 125 mil disk @ −29° C. | D302 Method G Procedure GC | >320 in-lb | 36 J |
| THERMAL | | | |
| Deflection Temperature 66 psi | D648 | 131° F. | 55° C. |
| Typical Processing Temperature | | 450–550° F. | 232–288° C. |

The preferred material for the reinforcing tube 15 is sold commercially by Advance Elastomer Systems under the Monsanto Company trademark SANTOPRENE® and is known as a thermoplastic elastomer. The SANTOPRENE material is also known as a thermoplastic rubber because in fact it is a thermoplastic elastomer which behaves like rubber in many respects but processes like a plastic material which it is.

The physical properties of the thermoplastic elastomer selected for this application are as follows:

| Resin Properties | ASTM Method | US Units | SI Units |
| --- | --- | --- | --- |
| Hardness (5 sec. shore at 25° C.) | D2240 | 80A–87A | — |
| Tensile Strength | D412 | 1600–2300 psi | 11.0–15.9 MPa |
| Ultimate Elongation (%) at 25° C. | D412 | 450–530% | — |
| 100% Modulus at 25° C. | D412 | 700–1000 psi | 4.8–6.9 MPa |
| Tear Strength | | | |
| at 25° C. | D624 | 194–278 psi | 34.0–48.7 kN/m |
| at 100° C. | | 75–133 psi | 13.1–23.3 kN/m |
| Tension Set (%) at 25° C. | D412 | 20–33 | — |
| Compression Set (%) 168 Hrs. | | | |
| at 25° C. | D395 | 29 | — |
| at 100° C. | | 41 | — |
| Brittle Point | D746 | −81—78° F. | −63—61° C. |

Other suitable high melt temperature, high impact polymers and copolymers, as well as other suitable thermoplastic rubbers would be known to most of ordinary skill in the art in view of the instant disclosure.

The end couplings 22 are preferably formed of the same material as the reinforcing tube 15 but of slightly lower durometer. It is important that both the couplings and the reinforcing tubes be bondable to the inner tubes 11 and to that end it is preferable that all materials include a common constituent, preferably polypropylene, so that there is bonding and indeed fusing of the inner and outer tubes to one another and to their couplings.

A preferred application of the composite tube of this invention is as an automotive heater hose. An automotive radiator 38 is shown schematically in FIG. 1. The radiator 38 includes an inlet 40 over which a coupling 22 has been telescoped. A clamp 42 surrounds the reinforcing tube end portion 20 and compresses both end portions and the internal section 24 into fluid tight intimate engagement with the inlet 40. As will be recognized from an examination of FIG. 1, the coupling flange 25 functions to locate the hose clamp 42 axially inwardly from the coupling end 32 as the composite tube is being installed.

The reliefs 30 provide one of the outstanding features of the invention. As a composite tube 10 is being installed on the radiator inlet 40, the reliefs 30 function to facilitate expansion of a composite tube end, facilitating the radial location and guiding of the coupling internal section 24 onto the inlet 40.

Tube Formation Process

Figure 4:
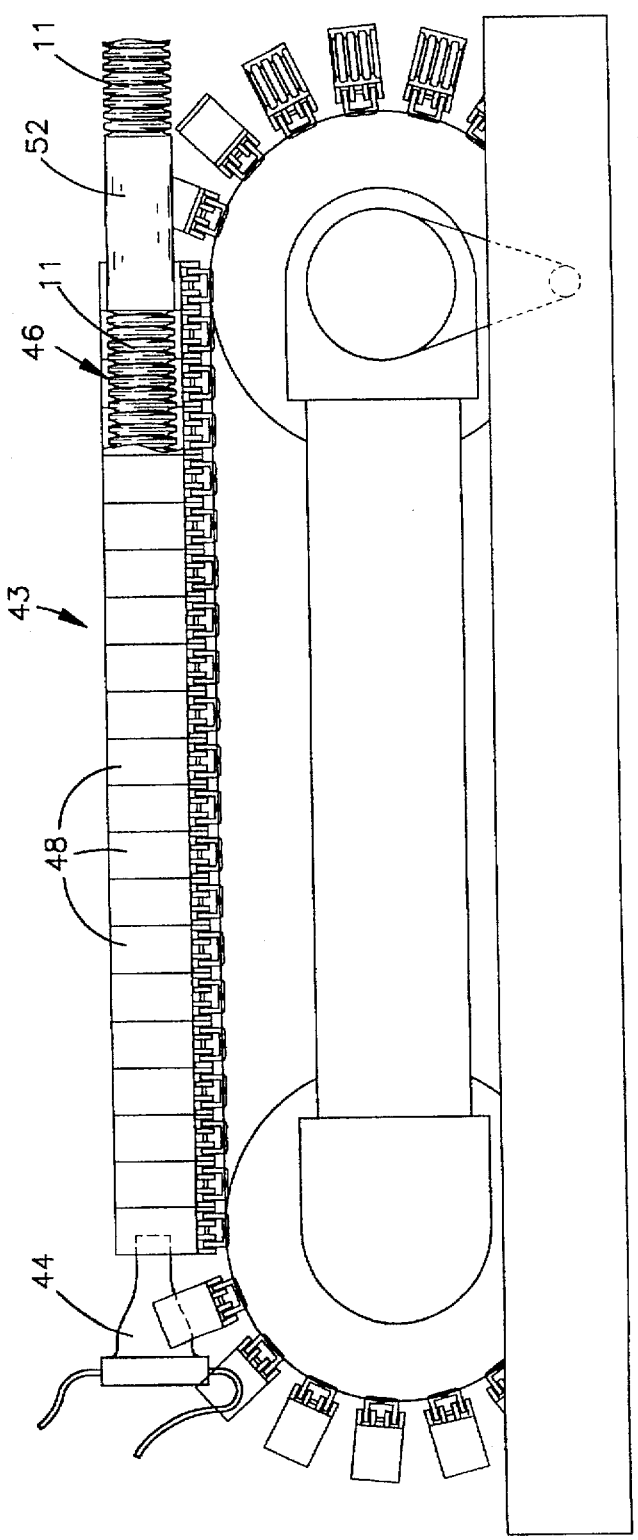
FIG. 4 is a sectional partially schematic view of a tube formation machine.

A machine 43 of the type used to manufacture the composite tube is shown schematically in FIGS. 3 and 4. The machine includes an extrusion die 44 for extruding material into a tunnel 46. The tunnel is delineated by a plurality of mating and continuously moving die sections 48. A pressure differential is established between the interior of the extruded material 45 and its exterior to cause the material to be forced against the die sections 48 in a known manner.

Downstream from the inner tube formation, a reinforcing tube extrusion die 50 extrudes a tubular quantity of the reinforcing tube material around and onto a continuous tube 52 formed as a series of longitudinally connected tubes 11. In order to assure bonding of the reinforcing tube to the inner tube, the reinforcing tube material is maintained at from about 360° F. to about 410° F. and extruded at a time when the inner tube is still at from about 100° F. to about 200° F. with the disclosed and preferred materials.

After the reinforcing tube 15 has been extruded around the continuous tube 52 and the end portions 14, 20 of the inner and reinforcing tubes have become bonded while the reinforcing tube has become bonded to the crests 16, the continuous tube is separated into tubes each having a central and spaced end sections. This tube separation is accomplished with a cutter shown schematically at 54.

Figure 5:
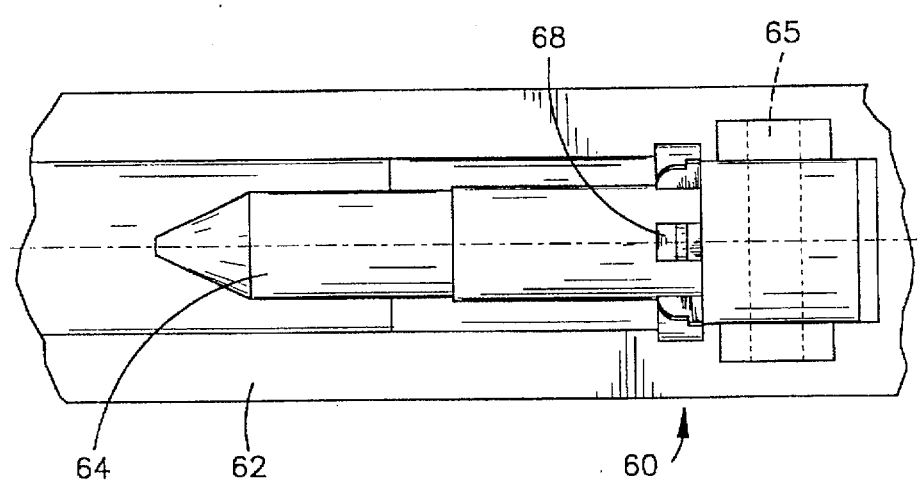
FIG. 5 is a plan view of the base die and core pin of the coupling formation mold of this invention.
Figure 6:
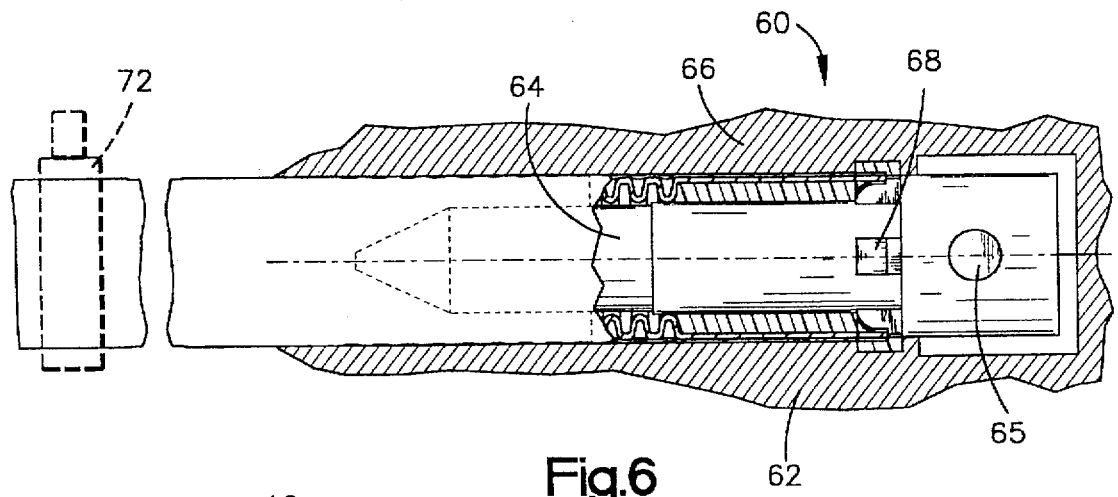
FIG. 6 is a cross sectional view of the coupling formation die with the core pin in its coupling formation position and the mold in an assembled condition; and, FIG. 7 is a schematic view showing a finished tube with a formed coupling being removed from the core pin with the pin disposed in its tube insert and removal position.
Figure 7:
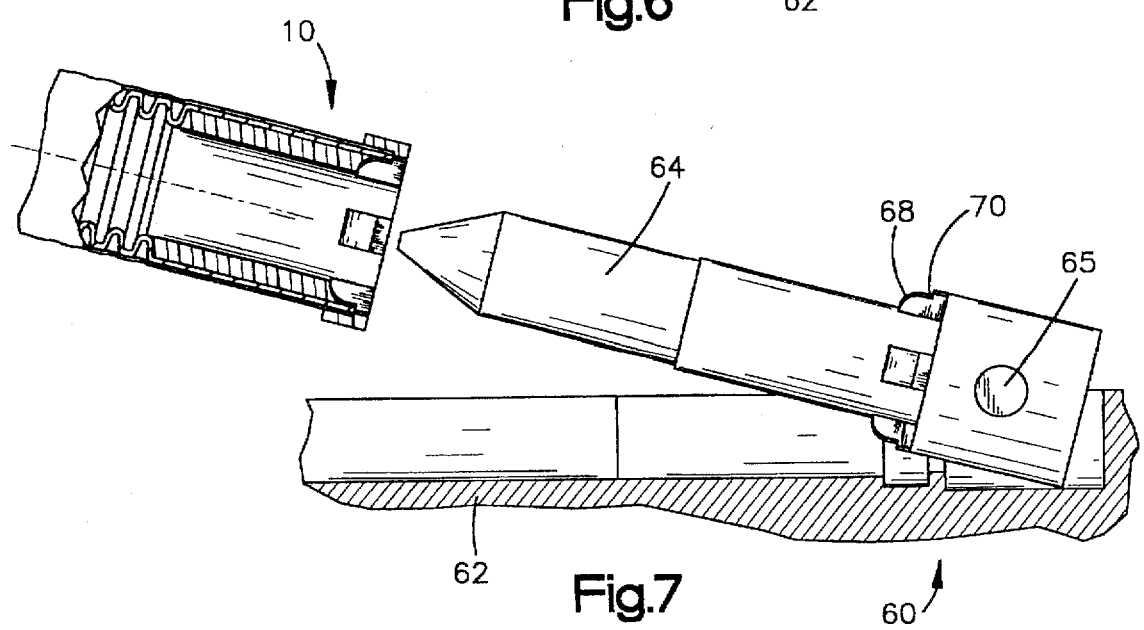

The end couplings 22 are individually formed on each composite tube 10 with a coupling mold shown generally at 60 in FIGS. 5, 6 and 7. The coupling mold 60 includes a base die section 62. A core section or pin 64 is pivotally connected to the base section 62 by a pivot at 65. The core pin is moveable between a tube receiving and removal position shown in FIG. 7 and a coupling molding position shown in FIG. 6. An upper die section 66 is mateable with a base die section 62 such that the two delineate the perimetral surfaces of a coupling to be formed.

In use the core pin is positioned in its tube receiving position of FIG. 7. The end portions 14, 20 of a composite tube are telescoped over the core pin and into engagement with at least 3 and preferably 4 circumferentially located die fingers 68. The tubing is moved downwardly, to the right as viewed in FIG. 7, until the inner tube end portion 14 is around and in engagement with the fingers 68 and the end 28 of the portion 14 engages shoulders 70 of the fingers. The fingers thus assure both axial location of the composite tube relative to the die and axial alignment of the tube concentrically about the core pin 64. The tube and core pin are next moved to the coupling formation position of FIG. 6. Next, a clamp 72 is fixed about the reinforcing tube 15 of the positioned composite tube 10 to prevent axial movement of the composite tube during the coupling formation operation. The upper die section 66 is then put in place.

After the composite tube has been appropriately positioned in the mold and the die sections have been fully assembled, heat softened thermoplastic resin is then injected into the die cavity to form a coupling 22. During this injection the temperature of the injected material is preferably maintained at least from about 360° F. to about 420° F. to insure full mold fill-out and thermal bonding of the coupling to the end portions 14, 20.

After the coupling has been formed the upper die section 66 is removed, the core is returned to its tube receiving and removal position of FIG. 7 and the tube with its completed coupling is removed from the core. The coupling formation process is then repeated by reversing the tube and placing its remote end over the core to form a coupling at the other end.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

We claim:

1. A method of making a composite tube comprising:
   a) forming a central section having an inner corrugated portion, said corrugated portion having corrugations, and a surrounding portion bonded to at least certain crests of the corrugations;
   b) forming a spaced pair of generally cylindrical end sections connected to opposite ends of the central section;
   c) telescoping one of the end sections over an internal, cylindrically contoured, die core part;
   d) continuing the telescoping until an inner surface of the one end section engages at least three circumferentially spaced die fingers around the core part thereby locating the one end section in concentric relationship with the core part;
   e) positioning an external die part in spaced concentric relationship around the one end section, the external die part having an inner surface contoured to the desired external configuration of a coupling being formed;
   f) injecting a heat softened, thermoplastic material into the space between the die inner surface and the core part to form a coupling having:
      i) a circumferentially endless portion within the one end section;
      ii) an external circumferentially endless portion surrounding the one end section;
      iii) an end part connecting the endless portions and overlying an end of the one end section; and,
      iv) at least three expansion recesses in the end part delineated by the fingers; and,
   g) the thermoplastic material as it is injected being maintained at a sufficiently elevated temperature to effect bonding between the coupling and the one end section.

2. The method of claim 1 wherein the thermoplastic material is injected at a temperature of from about 360° F. to about 420° F.

3. The method of claim 1 wherein the central section is formed at least in part by extruding thermoplastic material to form the inner portion and thereafter extruding further thermoplastic material to form the surrounding portion.

4. A method of forming an end coupling on a composite tube end section having inner and outer, intimately contacting, concentric, cylindrically contoured, polymeric, tube portions, the method comprising:
   a) telescoping the end section over an internal, cylindrically contoured, die core part;
   b) continuing the telescoping until an inner surface of an end part of the end section inner tube portion engages at least three circumferentially spaced die fingers disposed around the core part thereby locating the end section in concentric relationship with the core part;
   c) positioning an external die part in spaced concentric relationship around the end section, the external die part having an inner surface contoured to the desired external configuration of the coupling being formed;
   d) injecting a heat softened, thermoplastic material into the space between the die part inner surface and the end section and the core part to form a coupling having:
      i) a circumferentially endless portion within the end section inner tube portion;
      ii) an external circumferentially endless portion surrounding the end section outer tube portion;
      iii) an end part connecting the endless portions and overlying ends of the inner and outer tube portions; and,
      iv) at least three expansion recesses in the end part delineated by the fingers; and,
   e) the thermoplastic material as it is injected being maintained at a sufficiently elevated temperature to effect bonding between the coupling and the end section.

5. The method of claim 4 wherein the thermoplastic material is injected at a temperature of from about 360° F. to about 420° F.

* * * * *